United States Patent [19]

Zimmerman et al.

[11] Patent Number: 4,464,488

[45] Date of Patent: Aug. 7, 1984

[54] POLYURETHANES USING MONOCARBOXYLIC ACID SALTS OF BIS(AMINOETHYL)ETHER DERIVATIVES AS CATALYSTS

[75] Inventors: Robert L. Zimmerman; Bruce W. Peterson, both of Austin, Tex.

[73] Assignee: Texaco Inc., White Plains, N.Y.

[21] Appl. No.: 522,147

[22] Filed: Aug. 11, 1983

[51] Int. Cl.$^3$ .................... C08G 18/14; C08G 18/18
[52] U.S. Cl. .................................. 521/115; 521/116; 521/118; 521/129; 521/164; 528/49; 528/53; 564/471; 564/475; 564/508
[58] Field of Search ............... 521/118, 129, 164, 116, 521/115; 528/49, 53

[56] References Cited

U.S. PATENT DOCUMENTS

| | | | |
|---|---|---|---|
| 2,842,506 | 7/1958 | Roussel | 521/118 |
| 2,932,621 | 4/1960 | Terry | 521/118 |
| 3,769,244 | 10/1973 | Hashimoto et al. | 521/129 |
| 4,338,408 | 7/1982 | Zimmerman et al. | 528/49 |

*Primary Examiner*—H. S. Cockeram
*Attorney, Agent, or Firm*—Jack H. Park; Kenneth R. Priem; David L. Mossman

[57] ABSTRACT

The alkylene oxide adduct of bis(aminoethyl)ether may be reacted with formaldehyde in the presence of hydrogen and a hydrogenation-dehydration catalyst to produce compounds of the formula

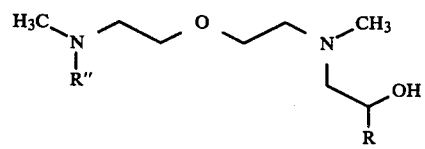

where R is hydrogen or lower alkyl of 1 to 4 carbon atoms and R" is methyl or

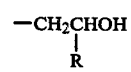

where R is as above.

Monocarboxylic acid salts of these compounds show unexpectedly high efficiency as polyurethane catalysts. Smaller amounts of this amine are required to produce foams having the same reaction profile as foams made with prior art amine salt catalysts.

13 Claims, No Drawings

POLYURETHANES USING MONOCARBOXYLIC ACID SALTS OF BIS(AMINOETHYL)ETHER DERIVATIVES AS CATALYSTS

BACKGROUND OF THE INVENTION

1. Field of the Invention

The invention relates to polyurethanes and the production thereof and more particularly relates to polyurethanes using monocarboxylic acid salts of amines which contain ether and hydroxyl moieties as catalysts.

2. Description of the Prior Art

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain extending isocyanate-hydroxyl reaction by which a hydroxyl-containing molecule is reacted with an isocyanate-containing molecule to form a urethane. This increases the viscosity of the mixture and provides a polyurethane containing a secondary nitrogen atom in the urethane groups. A second reaction is a crosslinking isocyanate urethane reaction by which an isocyanate-containing molecule reacts with a urethane group containing a secondary nitrogen atom. The third reaction which may be involved is an isocyanate-water reaction by which an isocyanate-terminated molecule is extended and by which carbon dioxide is generated to blow or assist in the blowing of the foam. The third reaction is not essential if an extraneous blowing agent, such as a halogenated, normally liquid hydrocarbon, carbon dioxide, etc. is employed, but is essential if all or even a part of the gas for foam generation is to be generated by this in situ reaction (e.g. in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

It has long been known that tertiary amines, such as trimethylamine, triethylamine, etc., are effective for catalyzing the second crosslinking reaction. Other typical tertiary amines are set forth in U.S. Pat. Nos. 3,925,368; 3,127,436; and 3,243,387 and German OLS Nos. 2,354,952 and 2,259,980. Some of the tertiary amines are effective for catalyzing the third water-isocyanate reaction for carbon dioxide evolution. However, tertiary amines are only partially effective as catalysts for the first chain extension reaction. To overcome this problem, the so-called "prepolymer" technique has been developed wherein a hydroxy-containing polyol component is partially reacted with the isocyanate component in order to obtain a liquid prepolymer containing free isocyanate groups. This prepolymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein a tertiary amine, such as triethylenediamine, is employed in conjunction with an organic tin compound. Triethylenediamine is particularly active for promoting the water-isocyanate reaction and the tin compound is particularly active in synergistic combination with the triethylenediamine for promoting the chain extension reaction. However, even here, the results obtained leave much to be desired. Triethylenediamine is a solid and must be dissolved prior to use to avoid processing difficulties. Also, triethylenediamine and other of the prior art amines can impart a strong amine odor to the polyurethane foam.

The prior art section of U.S. Pat. No. 4,338,408 describes other polyurethane catalysts and their deficiencies and is incorporated by reference herein. Many of these problems were solved by the bis(aminoethyl)ether derivatives of U.S. Pat. No. 4,338,408, and it is the monocarboxylic acid salts of these derivatives which are the focus of the instant disclosure.

Generally, the use of amine salts as catalysts for the production of polyurethanes is well known. Usually, the amount of acid added to the basic amine catalyst is not enough to totally neutralize it (which would greatly inhibit its catalytic activity). The result is a "delayed action" catalyst; that is, a polyurethane tertiary amine catalyst not quite as active as the original amine which formed the salt in the first place but which nevertheless allows the polyurethane reaction to proceed smoothly, rapidly and efficiently.

U.S. Pat. No. 2,932,621 teaches the preparation of polyurethane foam utilizing a salt of dimethylethanolamine and a dicarboxylic acid (such as oxalic acid) as the catalyst. Triethylenediamine (TEDA) diformate salt may be employed in combination with an amount of 1-(2-hydroxypropyl) imidazole (not greater than the amount of the salt) as a catalyst to permit wider latitude in the organic tin catalyst in preparing polyurethane foams, according to U.S. Pat. No. 3,728,291.

U.S. Pat. Nos. 3,862,150 and 4,165,412 involve similar salts of tertiary amines and alpha-substituted carboxylic acids as delayed action catalysts in preparing polyurethanes and epoxy resins. The acid must have a carboxylic acid group in one end of the molecule and a decomposition promoting group selected from CN, SO, $SO_2$, CO, $NO_2$, $COCH_3$ and CO-phenyl on the other end. An example is the salt of TEDA and cyanoacetic acid. Other typical amines mentioned are dimethylethanolamine and 2,2'-oxybis-dimethylethylamine.

Tertiary amino acid and tertiary amino acid-nitrile compositions have been found to be effective delayed action catalysts for polyurethane synthesis according to U.S. Pat. No. 4,086,213. These compounds, also referred to as salts, are to be used in combination with an organometallic catalyst, such as an organotin compound. The materials described in this patent are the reaction product of a primary or secondary amine, an aldehyde and a disubstituted acid; that is, a compound containing a carboxylic acid or nitrile group.

U.S. Pat. No. 4,115,634 teaches further that amine salts of amino acids are also good delayed action catalysts for organometallic catalyzed urethane synthesis. The acid which provides the basis for the salt is made by reacting an amine with an unsaturated acid, or with formaldehyde and hydrogen cyanide followed by hydrolysis of the resulting nitrile. A similar technique involving other amine salts of tertiary amino acids is revealed in U.S. Pat. No. 4,204,062. Here the salts are formed by initially reacting a primary or secondary amine with an aldehyde and a di-substituted acid to form a Mannich adduct and then reacting the resulting Mannich acid adduct with an amine.

Partial neutralization of tertiary amine catalysts such as per-methyl-tetraethylene pentamine and the like by aliphatic carboxylic acids, and subsequent use as catalysts in polyisocyanate addition processes, is apparently described in West German Offenlegungsschrift No. 2,812,256 (and European Pat. No. 4309) as abstracted in Derwent German Patents Abstracts, Week B40.

As can be seen from these brief descriptions, many of these amine salt catalysts are prepared by processes much too complicated to allow them to be useful and result in delayed action catalysts. There is a continuing need for polyurethane catalysts which are easily prepared and which give excellent reaction characteristics.

SUMMARY OF THE INVENTION

The invention is a method for producing a polyurethane which comprises reacting an organic polyisocyanate with an organic polyester polyol or polyether polyol in the presence of a catalytic amount of a monocarboxylic acid salt of an amine of the formula

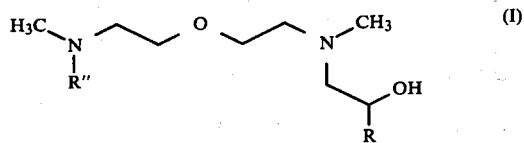

where R is hydrogen or lower alkyl of 1 to 4 carbon atoms and R" is methyl or

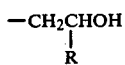

where R is as above.

DESCRIPTION OF THE PREFERRED EMBODIMENTS

Generally, the reactions to produce the catalyst of this invention proceed as follows. Bis(aminoethyl)ether of the formula H$_2$NCH$_2$CH$_2$OCH$_2$CH$_2$NH$_2$ is reacted with an alkylene oxide of the formula

in accordance with the method of U.S. Pat. No. 3,420,828, incorporated by reference herein, wherein R is hydrogen or lower alkyl of 1 to 4 carbon atoms to produce a compound of the formula

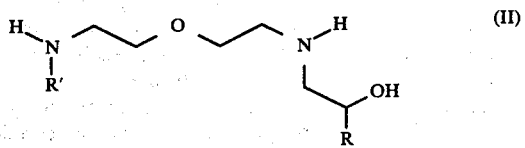

where R' is hydrogen or

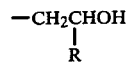

where R is as above. By the method of this invention, compound (II) is reacted with formaldehyde in the presence of hydrogen and a hydrogenation-dehydrogenation catalyst to make compound (I).

The reactions to make the polyurethane catalyst should be conducted at an elevated temperature. The alkoxylation step is preferably conducted in the temperature range from about 50° to 150° C., while the hydrogenation is preferably carried out in the temperature range from about 75° to 250° C. The hydrogen pressure in the second step is preferably from about atmospheric to 3,000 psig and is especially preferred to be on the order of about 1000 psig. The catalyst may be any hydrogenation-dehydrogenation catalyst, though it is preferred that the catalyst contain nickel, copper and chromium oxide or cobalt, copper and chromium oxide, and it is especially preferred that the catalyst be prepared according to the method described in U.S. Pat. No. 3,152,998 assigned to Texaco Chemical Co., incorporated by reference herein.

The starting materials are limited to bis(aminoethyl)ether and alkylene oxides. The alkylene oxides are preferably ethylene oxide, propylene oxide and butylene oxide, although higher oxides may be used. The formaldehyde reactant of the second step may be employed in another form, such as paraformaldehyde. The preparation of these amine derivatives of formula (I) is described in more detail in U.S. Pat. No. 4,338,408, incorporated by reference herein.

Next, the salt form of the catalyst must be created. To do this an amount of monocarboxylic acid salt is added to a quantity of the amine compound as defined in formula (I) above although the quantity of acid added should not be great enough to completely neutralize the amine. Preferably, the amount of acid used should range from about 5 to 95 mole equivalent % based on the number of active amine groups. Use of 100% mole equivalents acid to amine would give a totally neutralized product. Preferably, 15 to 75% mole equivalents of acid based on the amine is used. The acids should be monocarboxylic acids having preferably 1 to 18 carbon atoms. Di- and polycarboxylic acids should not be employed, and as will be shown, are not effective. The salts are formed immediately upon adding the acid to the amine.

While other amine catalysts may be present with the amines of formula (I) when the acid is added with no ill effects to the ultimate foam, similar salts of other amines, by themselves, will be shown to be absent of the beneficial effects obtained when amines of formula (I) are employed. Surprisingly, the catalysts of this invention have increased rather than decreased activity.

The suitability of the new monocarboxylic acid salts of bis(aminoethyl)ether derivatives as catalysts for foam formulations is shown in the remaining examples. The foams are all prepared by conventional means using conventional polyols, isocyanates and additives. For examples of conventional foam preparation, see the disclosure for U.S. Pat. No. 4,101,470, incorporated by reference herein.

To prepare polyurethanes using the catalysts here, any aromatic polyisocyanate may be used. Typical aromatic polyisocyanates include m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl)methane, bis(3-methyl-4-isocyanatophenyl)methane, and 4,4'-diphenylpropane diisocyanate.

Greatly preferred aromatic polyisocyanates used in the practice of the invention are 2,4- and 2,6-toluene diisocyanates and methylene-bridged polyphenyl polyisocyanate mixtures which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyl-diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

The hydroxyl-containing polyol component which reacts with the isocyanate may suitably be a polyester polyol or a polyether polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from 350 to 700. Semi-rigid foams of a desired flexibility are provided when the hydroxyl number is intermediate to the ranges just given. Also for a flexible urethane foam, the polyol should preferably have an average functionality of from about 2 to about 4 and a molecular weight of from about 2,000 to about 6,000. For rigid foams, the functionality of the polyol component is preferably from about 4 to about 8.

When the polyol is a polyester, it is preferable to use as the polyester, a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids as phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, azelaic acid, etc. may also be employed and are preferred. The alcohol component for the polyester should preferably contain a plurality of hydroxyl groups and is preferably an aliphatic alcohol, such as ethylene glycol, glycerol, pentaerythritol, trimethylolethane, trimethylolpropane, mannitol, sorbitol, or methyl glucoside. Mixtures of two or more of the above identified alcohols may be employed also if desired.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 2,000 to about 7,000. For flexible polyether polyurethane foams, the alkylene oxide is preferably propylene oxide or a mixture of propylene oxide and ethylene oxide.

For rigid polyether polyurethane foams, the polyol should have a functionality of from about 4 to about 8 and a molecular weight of from about 300 to about 1,200. Polyols for rigid polyether polyurethane foams may be made in various ways including the addition of an alkylene oxide as above to a polyhydric alcohol with a functionality of from 4 to 8. These polyols may also be, for example, Mannich condensation products of a phenol, an alkanolamine, and formaldehyde, which Mannich condensation product is then reacted with an alkylene oxide (see U.S. Pat. No. 3,297,597).

The amount of hydroxyl-containing polyol compound to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 0.9 to about 1.5 mole equivalents of isocyanate groups per mole equivalent of hydroxyl groups. However, for certain shock absorbing foams we have found that by using the catalyst of our invention the mole equivalents of isocyanate to hydroxyl groups can be as low as 0.4.

When water is used, the amount of water, based on the hydroxyl compound, is suitably within the range of about 0.05 mole to about 10.0 moles per mole equivalent of hydroxy compound.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc. may be used. The inert blowing agent reduces the amount of excess isocyanate and water that is required in preparing flexible urethane foam. For a rigid foam, the use of water is often avoided and the extraneous blowing agent is used exclusively. Selection of the proper blowing agent is well within the knowledge of those skilled in the art. See for example U.S. Pat. No. 3,072,082. Methylene chloride is especially preferred for the method herein.

The catalysts discovered here which are useful in the preparation of rigid or flexible polyester or polyether polyurethane foams, based on the combined weight of the hydroxyl-containing compound and polyisocyanate are employed in an amount of from about 0.03 to about 4.0 weight percent. More often, the amount of catalyst used is 0.06 to about 2.0 weight percent.

The catalysts of this invention may be used either alone or in a mixture with one or more other catalysts such as tertiary amines or with an organic tin compound or other polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such tertiary amines include trialkylamines (e.g., trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., and aliphatic polyamines, such as N,N,N'N'-tetramethyl-1,3-butanediamine.

Conventional formulation ingredients are also employed, such as, for example, foam stabilizers, also known as silicone oils or emulsifiers. The foam stabilizer may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (e.g. 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

When it is desired to prepare rigid foams, the "one-shot" method or the so-called "quasi-prepolymer method" is employed, wherein the hydroxyl-containing component preferably contains from about 4 to 8 reactive hydroxyl groups, on the average, per molecule.

In accordance with the "quasi-prepolymer method", a portion of the hydroxyl-containing component is reacted in the absence of a catalyst with the polyisocyanate component in proportions so as to provide from about 20 percent to about 40 percent of free isocyanato groups in the reaction product, based on the polyol. To prepare a foam, the remaining portion of the polyol is added and the two components are allowed to react in the presence of catalytic systems such as those discussed above and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the prepolymer or remaining polyol, or both, prior to the mixing of the component, whereby at the end of the reaction a rigid polyurethane foam is provided.

Urethane elastomers and coatings may be prepared also by known techniques in accordance with the present invention wherein a tertiary amine of this invention is used as a catalyst. See, for example, duPont Bulletin PB-2, by Remington and Lorenz, entitled "The Chemistry of Urethane Coatings".

The invention will be illustrated further with respect to the following specific examples, which are given by way of illustration and not as limitations on the scope of this invention.

EXAMPLE 1

These examples illustrate the use of these catalysts for the preparation of flexible urethane foams.

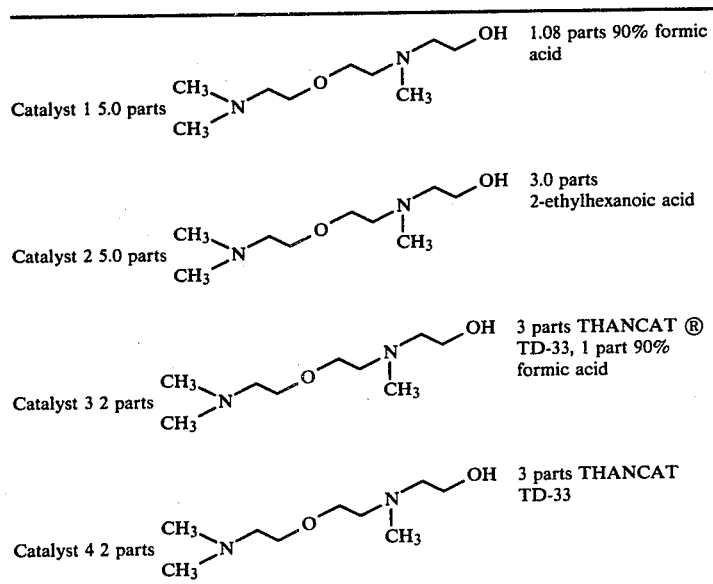

Catalyst 5 1 part THANCAT TD-33 0.15 parts 90% formic acid.

-continued

| Catalyst 6 5 parts $CH_3\text{-}N(CH_3)\text{-}CH_2CH_2\text{-}O\text{-}CH_2CH_2\text{-}N(CH_3)\text{-}CH_2CH_2\text{-}OH$ | 1.33 parts oxalic acid dihydrate, 1.7 parts dipropylene glycol |
|---|---|

| Foam No. | A | B | C | D | E | F | G | H | I |
|---|---|---|---|---|---|---|---|---|---|
| THANOL ® F-3016[1] | 100 | 100 | 100 | 100 | 100 | 100 | 100 | 100 | 100 |
| Silicone L-520[2] | 1.5 | 1.5 | 1.5 | 1.5 | 1.5 | 1.5 | 1.5 | 1.5 | 1.5 |
| Water | 5.0 | 5.0 | 5.0 | 5.0 | 5.0 | 5.0 | 5.0 | 5.0 | 5.0 |
| $CH_2Cl_2$ | 9.0 | 9.0 | 9.0 | 9.0 | 9.0 | 9.0 | 9.0 | 9.0 | 9.0 |
| Stannous Octoate | 0.6 | 0.6 | 0.6 | 0.6 | 0.6 | 0.6 | 0.6 | 0.6 | 0.6 |
| $CH_3\text{-}N(CH_3)\text{-}CH_2CH_2\text{-}O\text{-}CH_2CH_2\text{-}N(CH_3)\text{-}CH_2CH_2\text{-}OH$ | 0.25 | — | — | — | — | — | — | — | — |
| THANCAT ® TD-33[3] | — | — | — | — | — | — | 0.5 | — | — |
| Catalyst 1 | — | 0.25 | 0.28 | — | — | — | — | — | — |
| Catalyst 2 | — | — | — | 0.4 | — | — | — | — | — |
| Catalyst 3 | — | — | — | — | 0.3 | — | — | — | — |
| Catalyst 4 | — | — | — | — | — | 0.25 | — | — | — |
| Catalyst 5 | — | — | — | — | — | — | — | 0.58 | — |
| Catalyst 6 | — | — | — | — | — | — | — | — | 0.32 |
| Toluene diisocyanate | 66.7 | 66.7 | 66.7 | 66.7 | 66.7 | 66.7 | 66.7 | 66.7 | 66.7 |
| NCO/OH index 1.17 | | | | | | | | | |
| Cream time, sec. | 8 | 9 | 9 | 8 | 10 | 11 | 10 | 12 | 9 |
| Rise time, sec. | 90 | 90 | 75 | 77 | 85 | 115 | 90 | 90 | 120 |
| Sag back[4], (inches) | 0.1 | 0 | 0 | 0 | 0 | 0.3 | 0.3 | 0.1 | 0.1 |
| Final gel, sec. | 170 | 150 | 130 | 120 | 130 | 200 | 170 | 170 | 200 |

[1]Ethoxylated-propoxylated glycerine about 3000 molecular weight sold by Texaco Chemical Co.
[2]A silicone surfactant sold by Union Carbide.
[3]33% triethylenediamine in propylene glycol sold by Texaco Chemical Company.
[4]Bun height about 8 inches.

By way of summary, Catalysts 1, 2 and 3 are the unique catalysts of this invention. They are used in Foams B, C, D and E.

Foams A and B have the same rise time, although Foam B has a faster final gel. In addition, Foam B contains only 0.21 parts of amine (after substraction of the acid portion from 0.25 parts) whereas Foam A contains 0.25 parts of amine. Thus, the same rise time is obtained, but less amine is used. Foam C which contains 0.23 parts amine is faster on both rise and final gel. Thus, less amine gave a faster cure. Foam D which contains the same amount of amine as Foam A gave both faster rise and final gel times.

The conclusion from the above observations is that by partial neutralization with monocarboxylic acids like formic acid or 2-ethyl-hexanoic acid, a catalyst is created which gives faster reaction profiles than the unneutralized amine. This result is contrary to the teachings of the prior art and to normal common sense. Usually the reaction profile should be slower or about the same for the partially neutralized material. This conventional trend is seen in Foams G and H. In these foams, THANCAT TD-33 is used at the same level in both foams, except that in Foam H (using Catalyst 5), formic acid had been added. Both foams had the same rise and final gel times.

Foams E and F show that the same unexpected enhancement of reaction profile is obtained if THANCAT TD-33 (shown above to be unaffected by monocarboxylic acid addition) is flushed with 2-[N-dimethyl(aminoethoxyethyl)-N-methylamino] ethanol when the acid is added. That is, Foam E using Catalyst 3 shows a faster reaction profile than does Foam F using Catalyst 4 which contained no formic acid.

Finally, Foam I, using Catalyst 6, demonstrates that dicarboxylic acids such as oxalic acid do not give an amine salt catalyst which imparts faster reaction profiles to the resulting foams.

The amine salt catalysts of this invention also give foams that do not sag back or shrink as compared with foams made with the unneutralized amine.

EXAMPLE 2

The following additional foam was poured using a Martin-Sweets foam machine.

| THANOL F-3016 | 100 |
|---|---|
| SIL-WET 711[1] | 1.1 |
| Water | 2.8 |
| $CH_2Cl_2$ | 4.0 |
| 50% stannous octoate | 0.5 |
| Catalyst 3 | 0.30 |
| Toluene diisocyanate | 39.88 |
| NCO/OH index | 1.12 |
| Density pcf | 1.76 |
| ILD | |
| 25% | 37.8 |
| 65% | 70.6 |
| 25% | 27.1 |
| Tensile psi | 13.7 |
| Elongation, % | 143 |
| Tear, pli | 1.45 |
| Ball rebound, % | 48 |
| Breathability, cfm | 3.75 |
| ILD loss 25% | 18.5 |
| Compression Sets | |
| 50% | 2.5 |
| 90% | 2.0 |
| Humid Aged Compression Sets | |

| | |
|---|---|
| 50% | 5.1 |
| Humid Aged CLD loss | |
| 50% | 22.1 |

For some unknown reason, foams made using the catalysts of this invention made on a foam machine, instead of by hand as in Example I, do not show such an accelerated reaction profile.

Many modifications may be made in the method of this invention without departing from the spirit and scope thereof which are defined only in the appended claims. For example, one skilled in the art could find that a particular amine-monocarboxylic acid combination and proportion thereof could give a polyurethane catalyst with optimized properties.

We claim:

1. A method for producing a polyurethane which comprises reacting an organic polyisocyanate with an organic polyester polyol or polyether polyol in the presence of a catalytic amount of an increased activity monocarboxylic acid salt of an amine of the formula

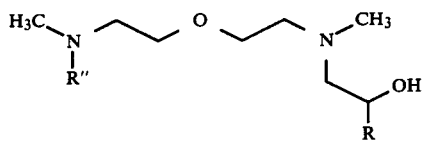

where R is hydrogen or lower alkyl of 1 to 4 carbon atoms and R'' is methyl or

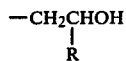

where R is as above.

2. The method of claim 1 where the polyurethane is a cellular polyurethane obtained by reacting said polyols with said polyisocyanate in the presence of a blowing agent.

3. The method of claim 2 in which the blowing agent is methylene dichloride.

4. The method of claim 1 in which the monocarboxylic acid used to make the salt has from 1 to 18 carbon atoms.

5. The method of claim 1 wherein said catalyst is a monocarboxylic acid salt of 2-[(N-(dimethylaminoethoxyethyl)-N-methylamino]ethanol.

6. The method of claim 1 wherein said catalyst is a monocarboxylic acid salt of 2-[N-dimethylaminoethoxyethyl)-N-methylamino]-1-methylethanol.

7. The method of claim 1 in which the amount of monocarboxylic acid mole equivalents to active amine mole equivalents is between 5 and 95%.

8. The method of claim 1 wherein a flexible urethane foam is produced.

9. The method of claim 1 wherein a rigid urethane foam is produced.

10. The method of claim 1 wherein a high resilient foam is produced.

11. The method of claim 1 wherein a packaging foam is produced.

12. The method of claim 1 wherein a flexible polyether polyurethane foam is provided which comprises reacting in the presence of a blowing agent said organic polyisocyanate with a polyether polyol formed by the addition of a polyhydric alcohol having a functionality of from 2 to about 4 with an alkylene oxide of 2 to 4 carbon atoms in the presence of said catalyst, said organic polyisocyanate being employed in an amount sufficient to provide 0.4 to 1.5 mole equivalents of isocyanate groups per mole equivalent of hydroxyl groups, said polyether polyol having a molecular weight within the range of about 2,000–7,000.

13. The method of claim 1 wherein a flexible polyester polyurethane foam is prepared which comprises reacting in the presence of a blowing agent, toluene diisocyanate with a hydroxyl terminated condensation product of a polycarboxylic acid and a polyhydric alcohol in the presence of said catalyst, said toluene diisocyanate being employed in an amount sufficient to provide 0.9 to 1.5 mole equivalents of isocyanate groups per mole equivalent of hydroxyl groups, said condensation product having a functionality of from about 2 to about 4, and a molecular weight from about 2,000 to about 6,000 and a hydroxyl number ranging from about 25 to about 60.

* * * * *